Jan. 7, 1930.  W. E. CROSBY  1,743,015
VALVE AND COCK
Filed Aug. 15, 1927
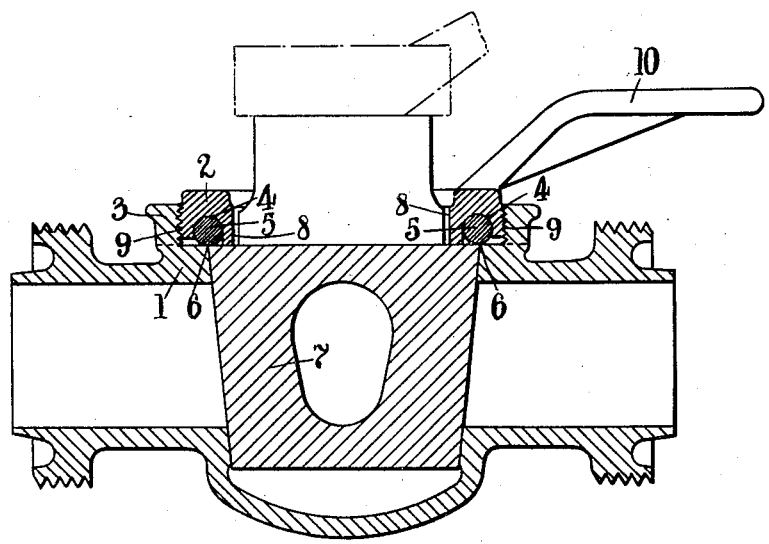
INVENTOR:
WILLIAM EDWARD CROSBY
by Wilkinson & Giusta
ATTORNEYS.

Patented Jan. 7, 1930

1,743,015

UNITED STATES PATENT OFFICE

WILLIAM EDWARD CROSBY, OF WANDSWORTH, LONDON, ENGLAND, ASSIGNOR TO THE ALUMINIUM PLANT AND VESSEL COMPANY, LIMITED, OF POINT PLEASANT, LONDON, ENGLAND

VALVE AND COCK

Application filed August 15, 1927, Serial No. 213,139, and in Great Britain August 23, 1926.

This invention relates to improvements in and relating to valves and cocks, and is directed to plug-cocks, such as rotary cylindrical, spherical, tubular and like valves, and plug, bib and stop taps.

An object of the present invention is to provide a construction of plug-cock or valve having an improved holding-down and packing device.

The accompanying drawing illustrates an example of a form of plug cock or valve constructed according to the present invention and embodying the features as above defined.

The barrel 1 adjacent the plug entrance is screw-threaded and receives a threaded collar 2, which collar forms the pressing or holding down component of the packing or leakage preventing device. In the example the barrel or body 1 has an upstanding internally threaded ring or flange 3, which ring or flange 3 may be an integral part of the barrel, or the ring may be an attached part. The collar 2 is externally threaded and engages the said ring part. Suitable means, such as a handle 10, may be provided for screwing the collar to the aforesaid ring. When a handle is provided the relationship between the various parts can be easily varied to suit requirements without having to use tools.

An appropriate face of the collar 2, has a groove 4 or the equivalent for receiving the packing component 5, which packing may be a resilient packing. In the present example the centre line of this packing 5 coincides, or substantially coincides, with the joint or juncture 6 between the plug 7 and the barrel 1.

The walls or ends 8 and 9 of the collar are of different length, that wall or end 8 remote from the screwed ring being extended in length to form a lower step or base extension, so that when the collar is moved towards the barrel, the lower step or base extension contacts with an appropriate part of the plug and forces this plug onto the barrel seating to effect an efficient working contact between the plug and the barrel seating.

In relationship of the various parts allowance may be made whereby the applied pressure imparted by the collar on the plug shall continue to be so applied even after a grinding-in operation or operations has or have been carried out.

In the example shown the relationship of the packing component to the other parts is such that it will not prevent the collar from contacting with the plug, but at the same time provides an effective seal to prevent leakage.

The invention is applicable to various types of cocks, as for example, a straight-through type, a multiway type and an angle type. In the particular example described the cock is of the straight-through type with inlet and outlet connections at right angles to the axis of rotation of the plug.

What I claim is:—

1. A valve, comprising in combination, a valve body, a plug, a member engaging said valve body, said member having a groove in its lower face and intermediate of its inner and outer edges, a packing component held in said groove and overlapping the adjacent meeting edges of the plug and valve body the base of said member being stepped, the lower step contacting with the plug so as to apply pressure directly thereto.

2. A valve, comprising in combination, a valve body, an upstanding screwed flange thereon, a plug, a screwed ring engaging said flange, said ring having a groove in its lower face and intermediate of its inner and outer edges, a packing component held in said groove and overlapping the adjacent meeting edges of the plug and valve body, the base of said ring being stepped, the lower and inner step contacting with the plug so as to apply pressure directly thereto.

In testimony whereof, I affix my signature.

WILLIAM EDWARD CROSBY.